Aug. 11, 1936.        P. H. MEYER        2,050,957
EYEGLASSES AND THE LIKE
Filed Sept. 8, 1934

INVENTOR.
Peter H. Meyer
by Parker, Prochnow & Harmer
ATTORNEYS.

Patented Aug. 11, 1936

2,050,957

UNITED STATES PATENT OFFICE 2,050,957

EYEGLASSES AND THE LIKE

Peter H. Meyer, Buffalo, N. Y.; Margaret C. B. Meyer, executrix of the estate of said Meyer, deceased, assignor to Margaret C. B. Meyer, Buffalo, N. Y.

Application September 8, 1934, Serial No. 743,243

6 Claims. (Cl. 88—49)

This invention relates to improvements in eyeglasses or spectacles and particularly to improvements in nose glasses or eyeglasses which are retained in operative position by nose-pieces engaging the nose of the wearer.

The nose-pieces of such eyeglasses are commonly offset inwardly from the plane of the lenses and thus form projections transverse to the plane of the lenses which are apt to catch on the clothing so as to prevent the glasses from being readily placed in or removed from the pocket of the wearer unless they are enclosed in a protecting case.

One object of the invention is to provide a practical and desirable eyeglass construction in which the nose-pieces are so arranged as to adapt the glasses to be readily placed in and removed from the user's pocket without the necessity for a protecting case, and in which nevertheless the nose-pieces can be readily adjusted to and reliably maintained in various different relations to each other and to the lenses as may be necessary to properly fit the eyeglasses to different users.

Another object of the invention is to provide a frame or mounting in which the splits in the lens rims and the securing means for the split ends required to enable the opening or expanding the rims for the insertion and removal of the lenses are located at the nasal sides of the rims, and the nose-pieces are connected to the rims so as to allow such expansion and contraction of the rims and the necessary different adjustments of the nose-pieces; and also to improve eyeglasses or ophthalmic mountings in the other respects hereinafter described and set forth in the claims.

Figure 1:
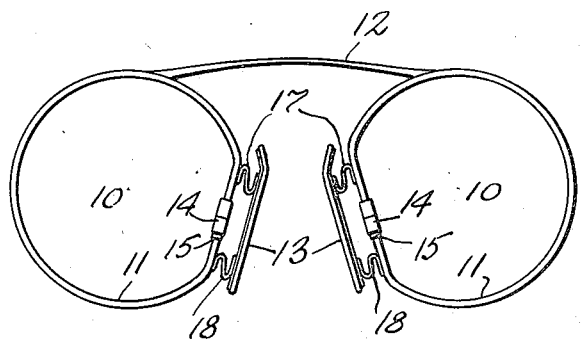
Fig. 1 is a rear elevation of a pair of eyeglasses embodying the invention.

In the illustrated embodiments of the invention, the lenses 10 are secured in rims 11 connected by a bridge member 12, and nose-pieces 13 are secured to the adjacent or nasal sides of the rims.

Each lens rim is split or divided at the nasal side portion thereof at 14, and the split ends are releasably or separably connected, for instance, by the usual screw 15 passing through a perforated lug 16 on one end of the rim and screwed into a threaded hole in a lug 16a on the other end of the rim so that by tightening the screw, the rim can be contracted about the periphery of the lens for securing it in the rim, and by loosening or removing the screw, the split ends of the rim can be opened or spread apart to enable the insertion or removal of the lens.

Figure 2:
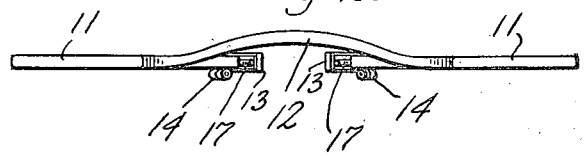
Fig. 2 is a plan view thereof.

Preferably, the bridge 12 is rigidly attached to the upper central portions of the rims, by bridge end portions which lie in the planes of the rims, and is of substantially the shape shown, being bowed upwardly slightly, and also bowed or bent forwardly, see Fig. 2, out of the plane of the lenses, to space the bridge forwardly out of contact with the nose or brows of the wearer.

Each nose-piece preferably consists of a narrow bar or strip provided with a facing or pad suitable for contact with the nose, and each nose-piece is secured to a pair of supporting arms 17 and 18 which project from the nose-piece towards the adjacent lens and are preferably fixed to the rim for said lens at opposite sides of the split in the rim. These supporting arms are made of wires or thin strips capable of being bent for adjusting the nose-piece to different positions relatively to the lens or rim. They may be of different forms and attached to the lens or rim and to the nose-piece in different ways, but preferably each supporting arm is of looped or S-formation, thus adapting the two arms to be separately or independently bent, as may be necessary, to adjust each nose-piece relatively to the lenses and to the other nose-piece to properly fit different users. For example, both ends of either nose-piece can be adjusted nearer to or farther from the adjacent lens, or one end of the nose-piece can be adjusted toward and the opposite end away from the lens so as thus to place the opposite nose-pieces nearer together or farther apart or at like or different distances from the lenses, or at corresponding or different angles to the vertical, as may be necessary to properly fit glasses to different noses.

Figure 3:
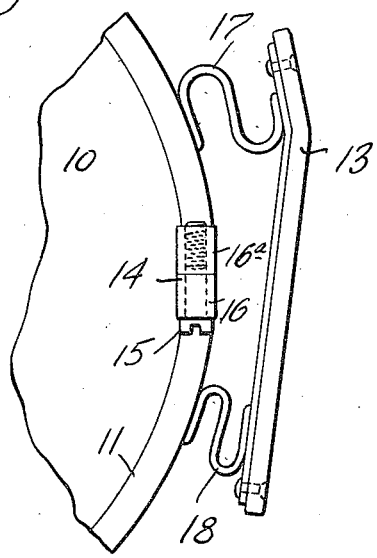
Fig. 3 is an enlarged, fragmentary, rear elevation, showing one of the nose pieces and the adjacent portion of one lens and rim.

As shown in Figs. 1 and 3, the two arms 17, 18 for each nose-piece are formed by separate wires or strips each attached, as by soldering, at or adjacent one end thereof to the rim and at or adjacent the other end thereof to the nose-piece near one end of the latter, and each of the arms is of substantially S-form.

Figure 4:
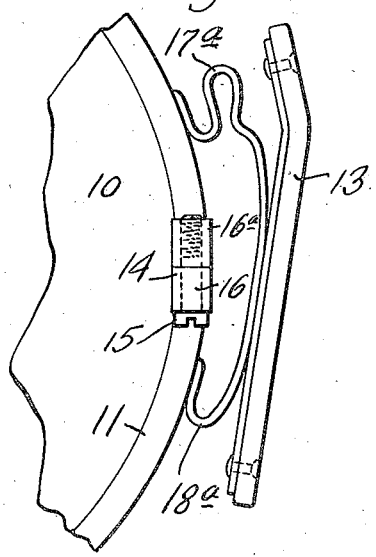
Fig. 4 is a similar view of a slightly modified construction.

As shown in Fig. 4, the two arms 17a, 18a are formed by the opposite ends of a single bowed wire or strip which is attached at its middle portion, as by soldering, to the intermediate portion of the nose-piece, one end of this strip which forms the upper arm 17a being of substantially S-form, and the other end forming the lower arm 18a being in the form of a single loop. While in this construction the two arms are formed by an integral wire or strip, nevertheless each arm is independently bendable so that the upper arm can be bent to determine the position of the upper end of the nose-piece, and the lower arm can be independently bent to determine the position of the lower end of the nose-piece. In both forms of the arms shown, they are connected at one end to the lens or rim and at the opposite end to the nose-piece at spaced points more or less adjacent the ends of the nose-piece, and the rim ends of the two arms are attached to the rim at the opposite sides of the split in the rim. Thus, the rim can be expanded or contracted to the extent necessary to release and secure the lens therein, the nose-piece supporting arms being adapted to bend or spring sufficiently to permit such expansion and contraction of the rim. Although the arms are bendable for adjusting the nose-pieces, they are stiff enough to stably hold the nose-pieces in the positions to which they may be adjusted by bending the arms, and the use of a pair of arms connected to each nose-piece at spaced points greatly lessens the liability of the nose-piece being thrown out of adjustment unintentionally.

Preferably, as shown, the supporting arms for the nose-pieces are arranged so as to support the nose-pieces substantially in the same plane with the lenses or lens rims and preferably also, the nasal sides of the rims or lenses adjacent to the nose-pieces are substantially straight and diverge downwardly away from each other approximately parallel with a symmetrical or normal divergence of the nose-pieces. By this formation of the lenses and rims, as shown in Fig. 1, a greater space or clearance is left between each nose-piece and the lens or rim to which it is connected, thus giving greater latitude of adjustment for the nose-pieces. With the narrow nose-pieces arranged substantially in the plane of the lens rims and lenses and with the bridge of the slightly bowed formation shown, the eyeglasses are free from projections which will prevent them from being readily placed in and removed from the wearer's pocket, and the glasses can be repeatedly put in and removed from the pocket without injury to them. There is therefore no need for a protecting case, and the glasses are especially desirable for users who do not wear glasses continuously, but only periodically and are frequently taking them off and putting them on.

I claim as my invention:

1. In a device of the character described, a pair of lens rims each split adjacent its nasal side, means releasably securing the split ends of each rim together, bridging means connecting the two rims, a pair of arms connected to and projecting from each rim at opposite sides of the rim split, and a nose-piece connected to and supported by said arms, each of said arms having a bendable loop between its rim and nose-piece connections to permit adjustments of the nose-pieces relative to the rims by bending said loops and to enable expansion of the rims when their split ends are released for the insertion or removal of lenses.

2. In a device of the character described, a pair of lens rims each split adjacent its nasal side, means releasably securing the split ends of each rim together, bridging means connecting the two rims, a pair of S-shaped arms connected at their inner end portions to each rim at opposite sides of the rim split, and a nose-piece secured to the outer end portions of said arms in spaced relation with the rim, said S-shaped arms forming adjustable means permitting adjustments of the nose-pieces relative to the rims, and enabling expansion of the rims when their split ends are released for the insertion or removal of the lenses.

3. In a device of the character described, a pair of lens rims each split adjacent its nasal side, means releasably securing the split ends of each rim together, bridging means connecting the two rims, nose-piece supports of arched form each secured adjacent one of its ends to one rim at one side of the rim split and extending outwardly and across the split and secured adjacent its opposite end to the rim at the opposite side of the split, and a nose-piece secured intermediate of its ends to the outwardly extending portion of each support, each support having at least one bendable loop portion adjacent each of its ends adapted to be bent to permit adjustments of the nose-pieces relative to the rims and to enable expansion of the rims when their split ends are released for the insertion or removal of lenses.

4. In a device of the character described, a pair of lens rims each split adjacent its nasal side, means releasably securing the split ends of each rim together, bridging means connecting the two rims, a pair of arms fixed at one end to and projecting from each rim at opposite sides of the rim split, and a nose-piece fixed to and supported by the other ends of said arms, said arms being of loop form and disposed approximately in the plane of the rims and being independently bendable between their rim and nose-piece connections to permit adjustments of the nose-pieces relative to the rims and to enable expansion of the rims when their split ends are released for the insertion or removal of lenses.

5. In a device of the character described, a pair of lenses, a pair of bendable looped arms connected to and projecting from the nasal side portion of each lens, and a nose-piece fixed to and supported by said arms, said arms being independently bendable to permit adjustments of the nose-pieces relative to the lenses, and said nose-pieces and arms being disposed substantially in the plane of said lenses and of a shape not to project transversely substantially out from the plane of the lenses, and bridging means connecting the lenses and attached thereto independently of said arms.

6. In a device of the character described, a pair of lenses, a pair of arms connected to and projecting from the nasal side portion of each lens, and a nose-piece fixed to and supported by said arms, said arms between their lens and nose-piece connections being formed with loops lying substantially in the plane of the lenses and being independently bendable to permit adjustments of the nose-pieces relative to the lenses, and said nose-pieces being disposed substantially in the plane of said lenses and of a shape not to project transversely substantially out from the plane of the lenses, and bridging means connecting the lenses and attached thereto independently of said arms.

PETER H. MEYER.